United States Patent

Cain, III

[15] 3,662,338

[45] May 9, 1972

[54] MODIFIED THRESHOLD DECODER FOR CONVOLUTIONAL CODES

[72] Inventor: Joseph Bibb Cain, III, Indialantic, Fla.

[73] Assignee: Radiation Incorporated, Palm Bay, Fla.

[22] Filed: Feb. 1, 1970

[21] Appl. No.: 111,336

[52] U.S. Cl. ..............................340/146.1 A, 340/146.1 AV

[51] Int. Cl. ......................................G06f 11/12, G08c 25/00

[58] Field of Search ...........340/146.1, 146.1 AQ, 146.1 AV, 340/172.5

[56] References Cited

UNITED STATES PATENTS

| | | | |
|---|---|---|---|
| 3,402,393 | 9/1968 | Massey | 340/146.1 AQ |
| 3,469,236 | 9/1969 | Gallager | 340/146.1 AQ |
| 3,587,042 | 6/1971 | Mitchell | 340/146.1 AQ |

*Primary Examiner*—Charles E. Atkinson
*Attorney*—Donald R. Greene

[57] ABSTRACT

A decoder for convolutional codes utilizes known threshold decoding techniques. The decoder is effective to resolve the dilemma encountered when no majority decision is available in the application of the conventional threshold decoding techniques because the estimates of the information bit to be decoded are equally divided in error and not in error. In those circumstances, the tie vote is broken by utilizing information contained in the received syndrome to specify one of the estimates of the information bit which is in error. By eliminating that estimate, a simple majority vote correctly determines the information bit since the previously encountered even split of the estimates no longer exists.

In an alternative decoded arrangement, a set of estimates for each error bit is derived and a threshold decision is made using these estimates, to remove the error bit from the estimate of the information bit. Here, again, ties are resolved by use of information contained in the syndrome of the error pattern.

15 Claims, 6 Drawing Figures

INVENTOR
JOSEPH B. CAIN III
BY Donald R. Greene
ATTORNEY

MODIFIED THRESHOLD DECODER FOR CONVOLUTIONAL CODES

BACKGROUND

1. Field of the Invention

The present invention relates generally to the field of error correcting codes for digital information processing systems, and in particular to threshold decoders for convolutional and related codes, and to modifications of such decoders.

2. Discussion of Prior Art

In a book entitled "Threshold Decoding" (M.I.T. Press, Cambridge, Mass., 1963), J. L. Massey describes a decoding technique in which a set of estimates is derived for the binary value of each information bit of a digital information sequence received in a convolutional code. The decoder makes a decision on the information bit value based on those estimates indicative of one value or the other which are in the majority (i.e., a majority vote).

While employing a very useful technique in decoding convolutional codes, threshold decoders are subject to certain limitations. Consider, for example, a convolutional code with constraint length three, an encoder for which is shown in FIG. 1. A sequence of information bits, $x_i$, is fed into a shift register having a number of stages equal to the constraint length of the code, three in this example. Thus, in accordance with the timing of the encoding in the system as determined by a suitable clock (not shown), information bits $x_1, x_2, x_3, x_4, \ldots, x_n$ are entered in sequence into the stages 11, 12 and 13 of the shift register, which has a capacity of only three bits during any given timing interval. The purpose of the encoder is to produce one or more coded sequences of bits wherein each bit in a coded sequence is a linear combination of information bits, i.e., a convolutional code. To that end, various stages of the shift register are coupled to modulo two adders 14 and 15 the outputs of which are supplied to separate channels (hereinafter designated channels "*a*" and "*b*") for transmission to a receiving station. In particular, the first and third stages, 11 and 13, respectively of the shift register are connected to input terminals of adder 14 via lines 19 and 20 and all three stages are connected to input terminals of adder 15 via lines 16, 17 and 18. The output of modulo-two adder 14 is the coded sequence of bits $y_i^a$ on line 22 (channel "*a*"), and the output of modulo-two adder 15 is the coded sequence of bits $y_i^b$ on line 23 (channel "*b*").

Clearly, for the encoder of FIG. 1, the coded sequences of bits outputted by the adders to these two transmission channels are defined by:

$$\begin{aligned} y_1^a &= x_1 & y_1^b &= x_1 \\ y_2^a &= x_2 & y_2^b &= x_1 \oplus x_2 \\ y_3^a &= x_1 \oplus x_3 & y_3^b &= x_1 \oplus x_2 + x_3 \\ y_4^a &= x_2 \oplus x_4 & y_4^b &= x_2 \oplus x_3 + x_4 \end{aligned} \qquad (1)$$

and so forth, where $\oplus$ denotes modulo-two addition.

In the course of transmission of the coded sequences via the respective channels, error bits are added to the transmitted bits, such that the bits received by the decoder at the receiving station are represented by $$\begin{aligned} r_i^a &= y_i^a \oplus e_i^a \\ r_i^b &= y_i^b \oplus e_i^b \end{aligned} \qquad (2)$$

where $r_i^a$ and $r_i^b$ are received bits, and $e_i^a$ and $e_i^b$ are error bits, with $i = 1, 2, 3, 4, \ldots, n$. The decoding problem then is to recover the information sequence, $x_1, x_2, x_3, \ldots$, from the received sequences $r_1^a, r_2^a, \ldots$, and $r_1^b, r_2^b, \ldots$.

Several suitable and well known decoding algorithms exist for this type of code. For example, sequential decoding as described by J. M. Wozencraft et al in *Sequential Decoding* (M.I.T. Press, Cambridge, Mass., 1961), and Viterbi's algorithm as described by A. J. Viterbi in "Error Bounds for Convolutional Codes and an Asymptotically Optimum Decoding Algorithm," *IEEE Transactions on Information Theory*, Vol. IT-13, pp 260–269, April 1967, both work very well on codes having the form of expressions (1) and (2), above. However, decoders based on these algorithms are extremely complex. In contrast, a threshold detector is relatively simple and readily implemented, but it is unsuitable for decoding the code provided by the encoder of FIG. 1 (and related codes as well as other types of codes, as will be discussed presently). The ineffectiveness of the threshold decoder on this type of code is attributable to a lack of sufficient estimates of each information bit from which to obtain a clear majority decision in the case of all double, or greater, error patterns. That is to say, a majority vote of the estimates of the information bit, as performed by a conventional threshold decoder, would serve to correct all single error patterns, and some double error patterns, but would likely result in incorrect decoding in other error patterns.

In particular, the code of the present example has a minimum distance $d = 5$ and can therefore correct all patterns of $t = 2$ errors (for a code with an odd minimum distance, $d = 2t + 1$). However, only four estimates of the first information bit, $x_1$, are available, as follows:

$$\begin{aligned} r_1^a &= x_1 \oplus e_1^a, \\ r_1^b &= x_1 \oplus e_1^b, \\ r_2^a \oplus r_2^b &= x_1 \oplus e_2^a \oplus e_2^b, \\ r_3^a \oplus r_4^a + r_4^b &= x_1 \oplus e_3^a \oplus e_4^a \oplus e_4^b. \end{aligned} \qquad (3)$$

These estimates, of course, are obtained using expressions (1) and (2), above, and following the rules that each estimate for a given information bit $x_i$ may contain only that information bit and one or more error bits, but any given error bit may appear in only one of the estimates. For a conventional threshold decoder to correct all double error patterns using a set of estimates of $x_1$ five estimates are required, whereas for this code only four estimates can be obtained. Implementation of a majority vote of the four available estimates as the decoded value of $x_1$ will nevertheless serve to correct all single error patterns and some double error patterns. That this situation prevails is readily understood by observing that a single error can cause only one of the four estimates to be in error, since any given error bit appears in only one of the estimates. Further, a double error will cause one, or at most two, of the estimates to be in error. For example, if the double error pattern were attributable to error bits $e_2^a$ and $e_2^b$, only the third estimate of the set (3), above, would be in error, whereas involvement of error bits $e_1^b$ and $e_3^a$ would produce errors in the second and fourth estimates of the set. Clearly, when only one estimate is in error, the correct value of $x_1$ is obtained by a majority vote; but when two estimates are in error, the majority voting only produces a two-two tie, i.e., an even split. There is no method of unambiguously resolving a tie in the majority voting with a conventional threshold decoder. Hence, such decoders are limited to convolutional codes in which a set of estimates at least equal in number to the minimum distance of the code is available.

Still another prior art decoding technique for error correcting codes, including those of the type to which the present invention is applicable, utilizes a syndrome calculator. A syndrome calculator for the code developed by the encoder of FIG. 1 is shown in FIG. 2. Bits $r_i^a$ in the received sequence on channel "*a*" are applied via line 28 to the three stages 29, 30, 31 of a shift register in that sequence. During each timing interval, the contents of the three stages are applied to modulo-two adder 27 via lines 32, 33, 34. Similarly, the bits $r_i^b$ in the sequence received on channel "*b*" are entered in sequence into the three stages 36, 37, 38 of a second shift register via line 35, and the bits in the first and last of those stages are applied to modulo two adder 27 via lines 39, 40. The binary output sequence of syndrome bits $S_i$ on line 41, then, constitutes the modulo-two sum of the contents of shift register stages 29, 30, 31, 36, and 38 during successive time intervals of a local clock (not shown) synchronized with the clock governing the timing of the encoder. $S_1$, for example, is $$S_1=r_1^a\oplus r_1^b=x_1\oplus e_1^a\oplus x_1\oplus e_1^b$$
$$=e_1^a\oplus e_1^b,$$

using the values presented in expressions (1) and (2), above. Similarly, and considering the function performed by the syndrome calculator structure of FIG. 2, $$S_2=r_1^a\oplus r_2^a\oplus r_2^b$$
$$=x_1\oplus e_1^a\oplus x_2\oplus e_2^a\oplus x_1\oplus x_2\oplus e_2^b$$
$$=e_1^a\oplus e_2^a\oplus e_2^b$$

For the code of the present example and the structure shown in FIG. 2, the first six syndrome bits are as follows:

$$S_1=e_1^a\oplus e_1^b$$
$$S_2=e_1^a\oplus e_2^a\oplus e_2^b$$
$$S_3=e_1^a\oplus e_1^b\oplus e_2^a\oplus e_3^a\oplus e_3^b$$
$$S_4=e_2^a\oplus e_2^b\oplus e_3^a\oplus e_4^a\oplus e_4^b$$
$$S_5=e_3^a\oplus e_3^b\oplus e_4^a\oplus e_5^a\oplus e_5^b$$
$$S_6=e_4^a\oplus e_4^b\oplus e_5^a\oplus e_6^a\oplus e_6^b \qquad (4)$$

It will be observed that the syndrome bits are dependent only upon the error bits, as is conventional in the implementation of a syndrome calculator for a particular code. Accordingly, if no errors are introduced in the coded sequence during transmission, each syndrome bit will be a binary "0", i.e., the output sequence of the syndrome calculator will be binary "0" continuously. In fact, each correctable error pattern has a different syndrome, and there is a one-to-one correspondence between the syndrome and the correctable error pattern. Thus, the syndrome bits could be used alone to identify the correctable error patterns in the received sequence. The disadvantage of that technique is its complexity and the accompanying complexity of implementing the decoder.

SUMMARY OF THE INVENTION

It is a principal object of the present invention to provide an improved threshold decoding technique for convolutional codes in which the decoder is capable of correcting all single and all double error patterns, and a large number of triple error patterns as well, despite the unavailability of a set of estimates of each information bit equal in number to the minimum distance of the code.

It is another object of the invention to provide an improved threshold decoder for convolutional codes, in which the decoder employs information contained in the syndromes of the error patterns of the received sequences to enable correction of error patterns which are not decodable by conventional threshold decoding techniques, and to reduce the complexity of the logic required for decoding by conventional syndrome utilization techniques.

Still another important object of the present invention is to provide a threshold decoder for convolutional codes which is capable of resolving ties in a majority vote to determine the correct value of an information bit in a received sequence.

Briefly, according to a major aspect of the invention, decoding of each information bit from the received coded sequence is always attempted by a majority vote of the estimates of the information bit, and when that attempt fails because of a tie of the estimates, which will occur relatively infrequently, then information obtained from the received syndrome is utilized to break the tie. In this way, all single and double error patterns, and a large number of triple error patterns, can be corrected. When the first information bit is decoded, the decision is fed back to succeeding received bits which are dependent upon that bit, to remove its effect from each of those received bits. Similarly, the error bits on which a decision has been made are fed back to succeeding syndrome bits to remove the effect of those error bits from future decisions. The decoder is then ready to begin decoding the second information bit, and so fourth.

The present invention permits the straightforward decoding of codes which cannot be decoded to the full error correcting capability guaranteed by their minimum distance using prior art threshold decoding techniques. Moreover, the present invention is applicable to block codes and to diffuse convolutional codes. The nonsystematic codes, which generally have a better distance structure than systematic codes can be decoded with this technique. While the technique bears some similarity to that described by Massey, op. cit., it differs in that the decoding process does not depend entirely on a set of independent estimates of the information bit to be decoded.

According to a second aspect of the invention, an initial attempt is made to decode the received bits by a threshold decision involving estimates of each error bit. If such a threshold decision can be made, the binary value of the error bit is uniquely determined and it is combined with a single estimate of the information bit to remove the effect of the error bit therefrom and thereby to decode the information bit. However, in the event of a tie in the estimates, information derived from the syndrome of the error pattern is employed to break the tie and thus reach an unambiguous threshold decision. As in the case of a decision obtained on the first attempt (i.e., no tie) the estimate of the error bit is added to the estimate of the information bit to remove the former from the latter.

In both aspects of the invention, once a final estimate of the bit in question has been determined, or its value determined, the information thus obtained is fed back to appropriate points of the decoder to remove the effect of the formerly unresolved items from all future decisions concerning this code.

Therefore, yet another object of the present invention is the provision of a threshold decoder in which removal of transmission errors from information bits is implemented by a majority vote of estimates of the respective error bit, with resolution of a tie by use of information contained in the syndrome of the error pattern.

BRIEF DESCRIPTION OF THE DRAWINGS

In describing the invention by way of specific embodiments and components, which are to be treated as providing examples only, reference will be made to the accompanying set of drawings, in which.

DETAILED DESCRIPTION OF THE PREFERRED EMBODIMENTS

Figure 1:
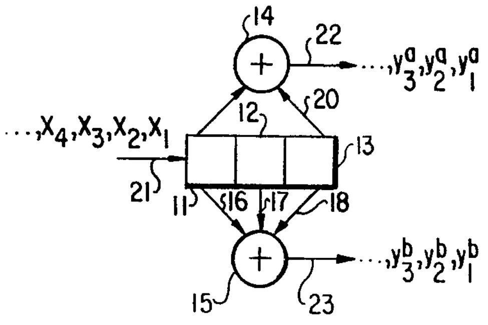
FIG. 1 is a circuit diagram of an encoder for a convolutional code to be used in describing the function and operation of certain embodiments of the invention.

Continuing with the same example of a convolutional code as was discussed earlier with reference to FIGS. 1 and 2, it will be observed by simple counting that there are seventeen double error patterns productive of a two-two tie in the estimates of expressions (3), above. These error patterns and their syndromes are given in the following table:

| Error Pattern | Syndrome $S_6$ | $S_5$ | $S_4$ | $S_3$ | $S_2$ | $S_1$ | Boolean Function |
|---|---|---|---|---|---|---|---|
| $e_1^a e_1^b$ | 0 | 0 | 0 | 0 | 1 | 0 | $T_1$ |
| $e_1^a e_2^a$ | 0 | 0 | 1 | 0 | 0 | 1 | $T_3$ |
| $e_1^a e_2^b$ | 0 | 0 | 1 | 1 | 0 | 1 | $T_3$ |
| $e_1^a e_3^a$ | 0 | 1 | 1 | 0 | 1 | 1 | $T_4$ |
| $e_1^a e_4^a$ | 1 | 1 | 1 | 1 | 1 | 1 | $T_4$ |
| $e_1^a e_4^b$ | 1 | 0 | 1 | 1 | 1 | 1 | $T_4$ |
| $e_1^b e_2^a$ | 0 | 0 | 1 | 0 | 1 | 1 | $T_3$ |
| $e_1^b e_2^b$ | 0 | 0 | 1 | 1 | 1 | 1 | $T_3$ |
| $e_1^b e_3^a$ | 0 | 1 | 1 | 0 | 0 | 1 | $T_4$ |
| $e_1^b e_4^a$ | 1 | 1 | 1 | 1 | 0 | 1 | $T_4$ |
| $e_1^b e_4^b$ | 1 | 0 | 1 | 1 | 0 | 1 | $T_4$ |
| $e_2^a e_3^a$ | 0 | 1 | 0 | 0 | 1 | 0 | $T_4$ |
| $e_2^a e_4^a$ | 1 | 1 | 0 | 1 | 1 | 0 | $T_4$ |
| $e_2^a e_4^b$ | 1 | 0 | 0 | 1 | 1 | 0 | $T_4$ |
| $e_2^b e_3^a$ | 0 | 1 | 0 | 1 | 1 | 0 | $T_4$ |
| $e_2^b e_4^a$ | 1 | 1 | 0 | 0 | 1 | 0 | $T_4$ |
| $e_2^b e_4^b$ | 1 | 0 | 0 | 0 | 1 | 0 | $T_4$ |

The decoding strategy is to use the occurrence of the syndromes in the above table to eliminate one of the estimates of expressions (3), above, so that three estimates remain, only one of which is in error. A simple majority vote of these three remaining estimates correctly determines the first information bit, $x_1$.

Figure 2:
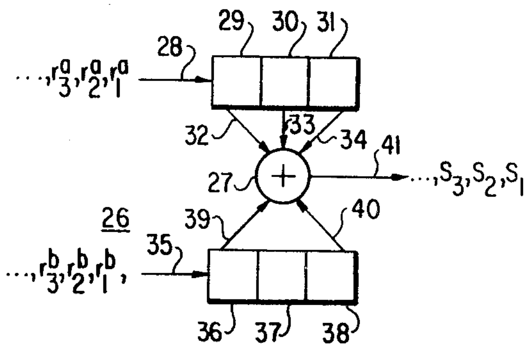
FIG. 2 is a circuit diagram of a syndrome calculator for the code developed by the encoder of FIG. 1.
Figure 3:
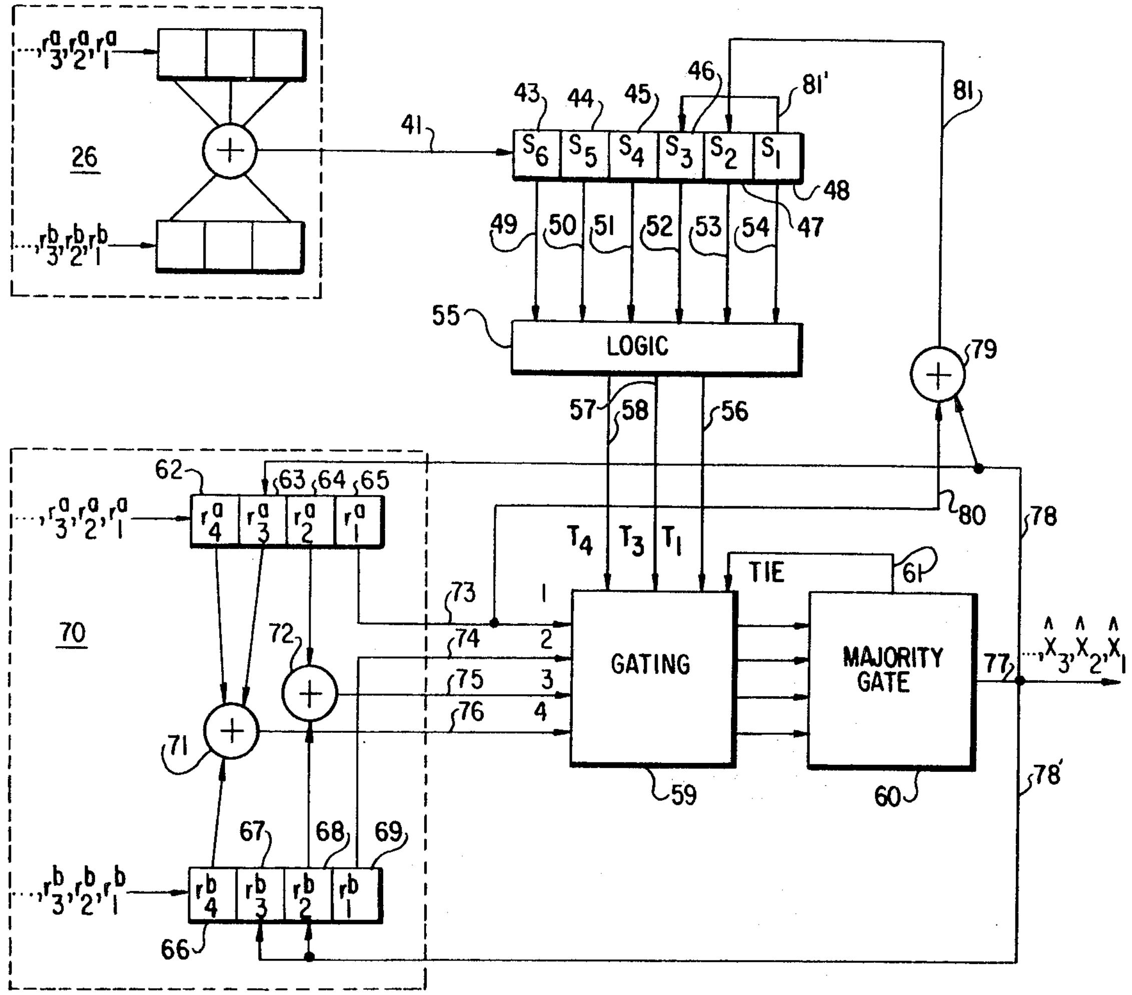
FIG. 3 is a circuit diagram of a specific embodiment of a modified threshold decoder according to the invention.

FIG. 3 illustrates a preferred embodiment of a decoder utilizing the techniques of the present invention. The decoder includes a syndrome calculator 26 which has been fully described with reference to FIG. 2. The syndrome bits $S_i$ outputted by the syndrome calculator are entered sequentially into the six stages 43 – 48 of a shift register. The contents of the latter register are read out in parallel for application to logic circuit 55 via respective leads 49 – 54. Logic circuit 55 is implemented to generate the Boolean functions $T_1$, $T_3$, and $T_4$ from the syndrome bits, as follows:

$$T_1=\overline{S}_1\overline{S}_3\overline{S}_5\overline{S}_6$$
$$T_3=S_4\overline{S}_5\overline{S}_6+\overline{S}_1S_4$$
$$T_4=S_5+S_1S_6+S_3\overline{S}_4+\overline{S}_3\overline{S}_4S_6 \qquad (5)$$

These are Tie-breaking functions in that each is effective in the event of a tie in the vote, to eliminate an estimate of the information bit applied as a respective input 1, 3, 4 of gating circuit 59, to which the T functions are applied via lines 56, 57, 58. The particular T function which is effective to provide this tie-breaking action depends upon the particular error pattern (and, thus, the particular syndrome) encountered, in accordance with the above table.

The four estimates of expressions (3) are implemented by an estimator 70 comprising shift register stages 62 – 65 into which received bits $r_i^a$ are sequentially entered, shift register stages 66 – 69 into which received bits $r_i^b$ are sequentially entered, and the associated logic including modulo-two adders 71 and 72 and the line 73 – 76. The latter lines provide inputs 1, 2, 3, 4 to gating circuit 59, corresponding respectively to the estimates of the first information bit $x_1$ in the order listed in expressions (3).

The output of gating circuit 59, representing the estimates of the information bit $x_i$ which have been passed unaltered by the gate, are supplied to a majority gate circuit 60. The latter gate is implemented to logically combine the estimates in ANDED permutations of three to produce four sets of three estimates each, which are then logically summed (OR function) to produce a majority decision. This is a purely conventional implementation of a Boolean majority function. If the four original estimates are designated as $E_1$, $E_2$, $E_3$ and $E_4$, the majority function $\hat{x}$ in this example is:

$$\hat{x}=(E_1\cdot E_2\cdot E_3)+(E_1\cdot E_2\cdot E_4)$$
$$+(E_1\cdot E_3\cdot E_4)+(E_2\cdot E_3\cdot E_4)$$

For each received bit, all of the estimates are initially passed unaltered by gating circuit 59, as synchronized by timing signals from an appropriate clock (not shown). Thus, the majority decision implemented by majority gate circuit 60 is based, at the outset, on all available estimates of the information bit corresponding to that time slot. For the first information bit, $x_1$, of course, these estimates are the ones initially implemented by shift register stages 62 – 69 and logic 71 – 76, and correspond to expressions (3), above. For succeeding information bits, the estimates of the respective bit are revised accordingly as will be explained presently. If none of the estimates of a given information bit $x_i$ is in error, or only one estimate is in error, then quite clearly more correct estimates than erroneous estimates are applied to majority gate 60 and an immediate majority decision is available.

However, if the correct and erroneous estimates are evenly split, a tie results and a decision by the majority gate logic requires a resolution of that tie. To that end, the majority gate is further constructed to implement a Boolean logic function constituting a Tie signal, as follows:

$$\text{Tie}=(\overline{E}_1\cdot\overline{E}_2\cdot E_3\cdot E_4)+(\overline{E}_1\cdot E_2\cdot\overline{E}_3\cdot E_4)+(\overline{E}_1\cdot E_2\cdot E_3\cdot\overline{E}_4)$$
$$+(E_1\cdot\overline{E}_2\cdot\overline{E}_3\cdot E_4)+(E_1\cdot\overline{E}_2\cdot E_3\cdot\overline{E}_4)+(E_1\cdot E_2\cdot\overline{E}_3\cdot\overline{E}_4)$$

where the bar above a bit symbol denotes the complement of that bit, as is customary notation. This Tie signal is generated by majority gate 60 when a tie of the estimates actually occurs, and is applied via line 61 back to gating circuit 59 to enable the latter gating circuit to eliminate one of the estimates on its input lines 1, 3 and 4, in accordance with the tie-breaking functions $T_1$, $T_3$ and $T_4$. As previously observed, the specific tie-breaking function which is effective to stifle an erroneous estimate depends upon the particular error pattern detected, as indicated by the syndrome corresponding to that pattern. That is, only one of $T_1$, $T_3$ and $T_4$ will cause an alteration in the normal outputs of gating circuit 59, and that will occur only upon coincident application of a Tie signal to gating circuit 59. Clearly, this operation requires that the estimates of a given information bit be applied to gating circuit 59 in two consecutive time slots.

The elimination of an erroneous estimate by use of information derived from the error syndrome, so that the threshold decoder can make a majority decision regarding the correct value of the information bit upon application of the remaining estimates (altered set of estimates) to majority gate 60, is a significant feature of the present invention.

When a majority decision has been made respecting the first information bit $x_1$, either based on the unaltered original estimates or, in the event of a tie, on the altered set of estimates, the information derived from that decision is fed back to other logic circuitry of the decoder to permit the decoder to take that information into account in future decisions. In particular, the decoded information $x_1$ is outputted by majority gate 60 on line 77 for appropriate utilization and is also applied via line 78 to logic affecting the estimates of the next information bit and affecting the error syndrome for determination of the value of the tie-breaking functions. The estimates of the next information bit, $x_2$, are the same as those designated in expressions (3), above, for information bit $x_1$, except that the subscripts are incremented by 1, and $x_1$ is subtracted from $r_2^b$, $r_3^a$, and $r_3^b$. Estimates of succeeding bits are determined in a similar manner, with reference to the last information bit on which a decision has been made. Implementation of this removal of the effect of $x_1$ from the estimates of $x_2$ is achieved by applying the decoded information bit $\hat{x}_1$ back to the shift register stages 63, 68, and 67 containing $r_3^a$, $r_2^b$ and $r_3^b$, respectively, for modulo-two addition to the contents of those stages. Further, to remove the effect of error bits $e_1^a$ and $e_1^b$, whose value has been determined by the decision made in decoding the first information bit, from future decisions involving syndrome bits $S_2$ and $S_3$, the following technique is utilized. The decoded information bit $\hat{x}_1$ is applied to modulo-two adder 79, to which is also applied the bit constituting $r_1^a$ from register stage 69 via line 80. The modulo-two sum is fed on line 81 to register stage 47 for modulo-two addition to bit $S_2$. Bit $S_1$ is fed back from register stage 48 to stage 46 via line 81' for modulo-two addition to bit $S_3$. The decoder is then ready to decode the second information bit, $x_2$. Decoding of further bits is carried out automatically by the circuit of FIG. 3 in the manner which has been described.

Tie-breaking functions could be implemented for each of the estimates in the decoder of FIG. 3, i.e., including the estimate on input 2 of gating circuit 59, rather than simply providing functions $T_1$, $T_3$ and $T_4$. However, this would clearly produce needless complexity because a double error pattern can always be corrected by exercising an alteration capability on only three of the four estimates, to eliminate (or to correct) only an erroneous estimate among those three.

As a further consideration regarding reduction of complexity, it will be observed that in addition to correcting all single and double error patterns, the decoder of FIG. 3 can correct a large number of triple error patterns. Obviously, any triple error pattern which causes none or only one of the estimates of an information bit to be in error is automatically decoded by the decoder of FIG. 3. On the other hand, a triple error pattern which causes three of the estimates of an information bit to be in error will result in incorrect decoding of that bit. A triple error pattern which causes two of the estimates of an information bit to be in error and one error in the error bits appearing in the syndrome but not in the estimates of that information bit, may be correctable depending upon whether the syndrome for that error pattern differs from those designated in the table set forth earlier in this specification. If the syndrome is different, logic is available to eliminate one of the estimates of that information bit. It may be advantageous, in a given situation, however, not to attempt to correct triple error patterns, and in that case the decoder logic of FIG. 3 is subject to considerable simplification. In particular, rather than using the tie-breaking logic functions in expressions (5), which themselves were simplified by using non-occurring syndrome patterns in a tie of the estimates as "don't care" terms, the following Boolean functions are implemented instead:

$$T_1=\overline{S}_1\cdot\overline{S}_5\cdot\overline{S}_6,$$
$$T_3=S_4\cdot\overline{S}_5\cdot\overline{S}_6,$$
$$T_4=S_5+S_6. \qquad (6)$$

Figure 4:
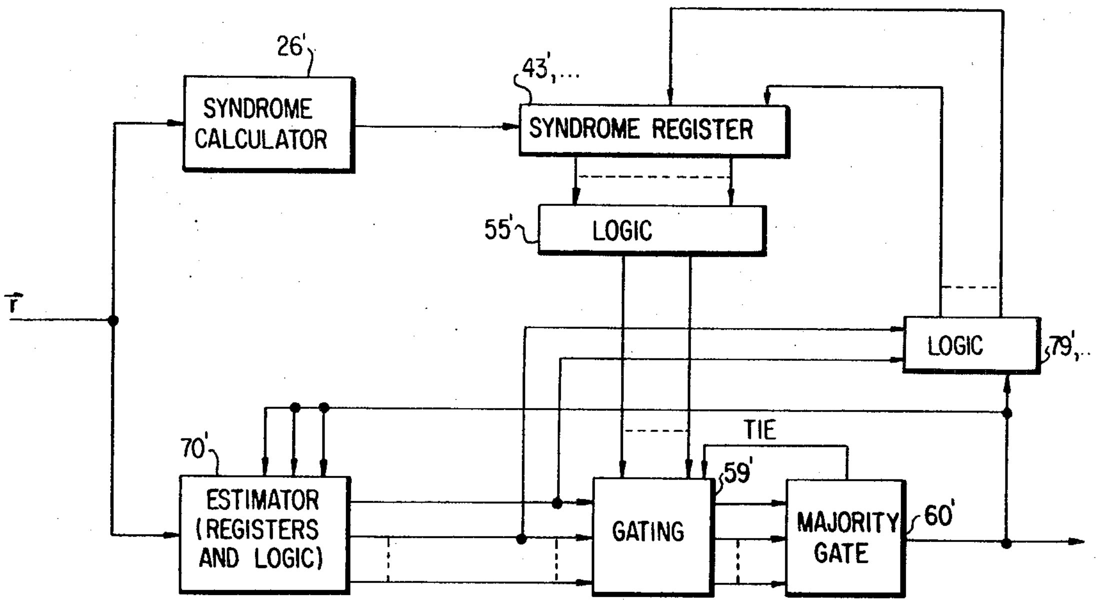
FIG. 4 is a circuit diagram of a more generalized form of the decoder of FIG. 3.

A generalized form of the modified threshold decoder of FIG. 3 is shown in FIG. 4, for use with any convolutional code having an odd minimum distance, $d$. A set of $d-1$ independent estimates of each information bit, $x_i$, is obtained and a majority vote of these estimates is taken to determine the value of the information bit being decoded. When a tie occurs in the vote, information is extracted from the syndrome to resolve the tie. For some codes, the maximum number of independent estimates obtainable is less than $d-1$. In such an instance, the decoder is readily modified using the techniques of the present invention to provide the somewhat more complex logic required to extract the necessary information from the syndrome.

The operation of the generalized modified threshold decoder of FIG. 4 to generate decoded information bits $\hat{x}_1$, $\hat{x}_2$, $\hat{x}_3$, . . . , $\hat{x}_N$ from the received vector $\vec{r}$ (i.e., the received sequence) should be apparent to those of ordinary skill in the relevant art from the foregoing description of a specific embodiment. Hence, further description of the decoder of FIG. 4 is deemed unnecessary, the components corresponding to those of FIG. 3 having primed reference numerals in FIG. 4.

Figure 6:
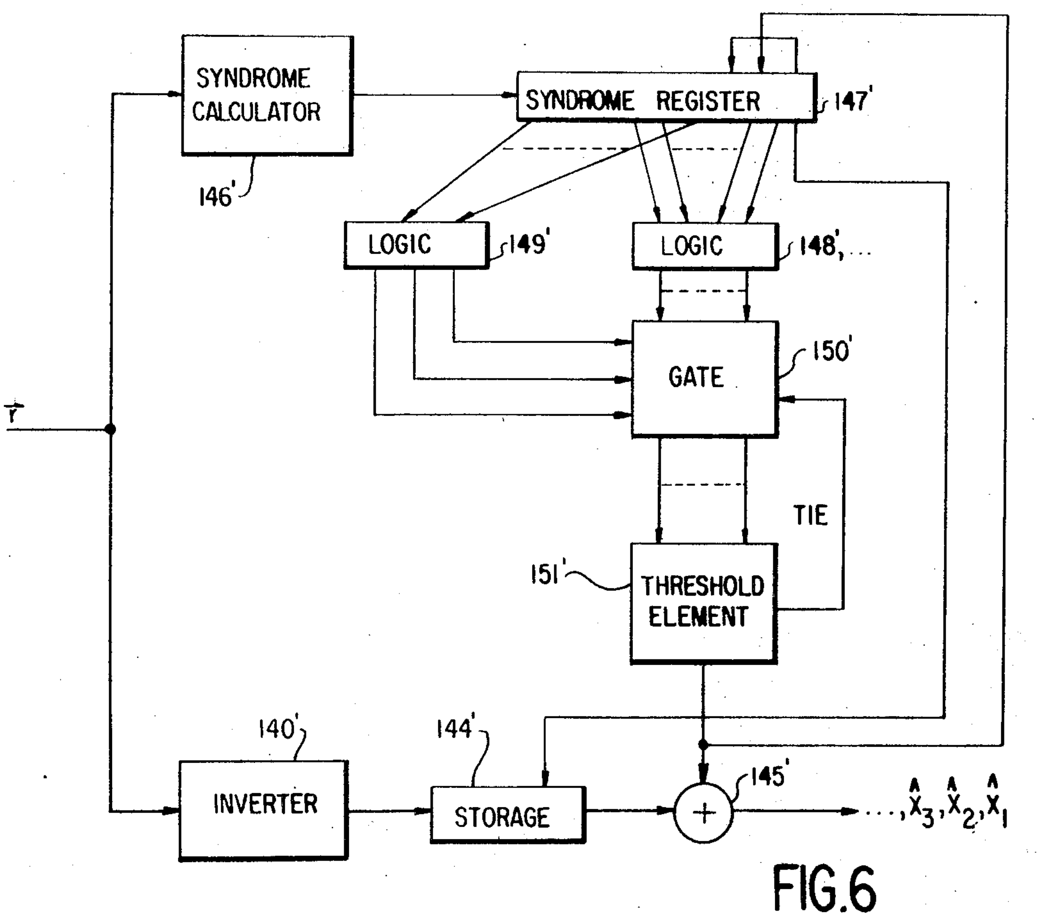
FIG. 6 is a circuit diagram of a more generalized form of the decoder of FIG. 5.
Figure 5:
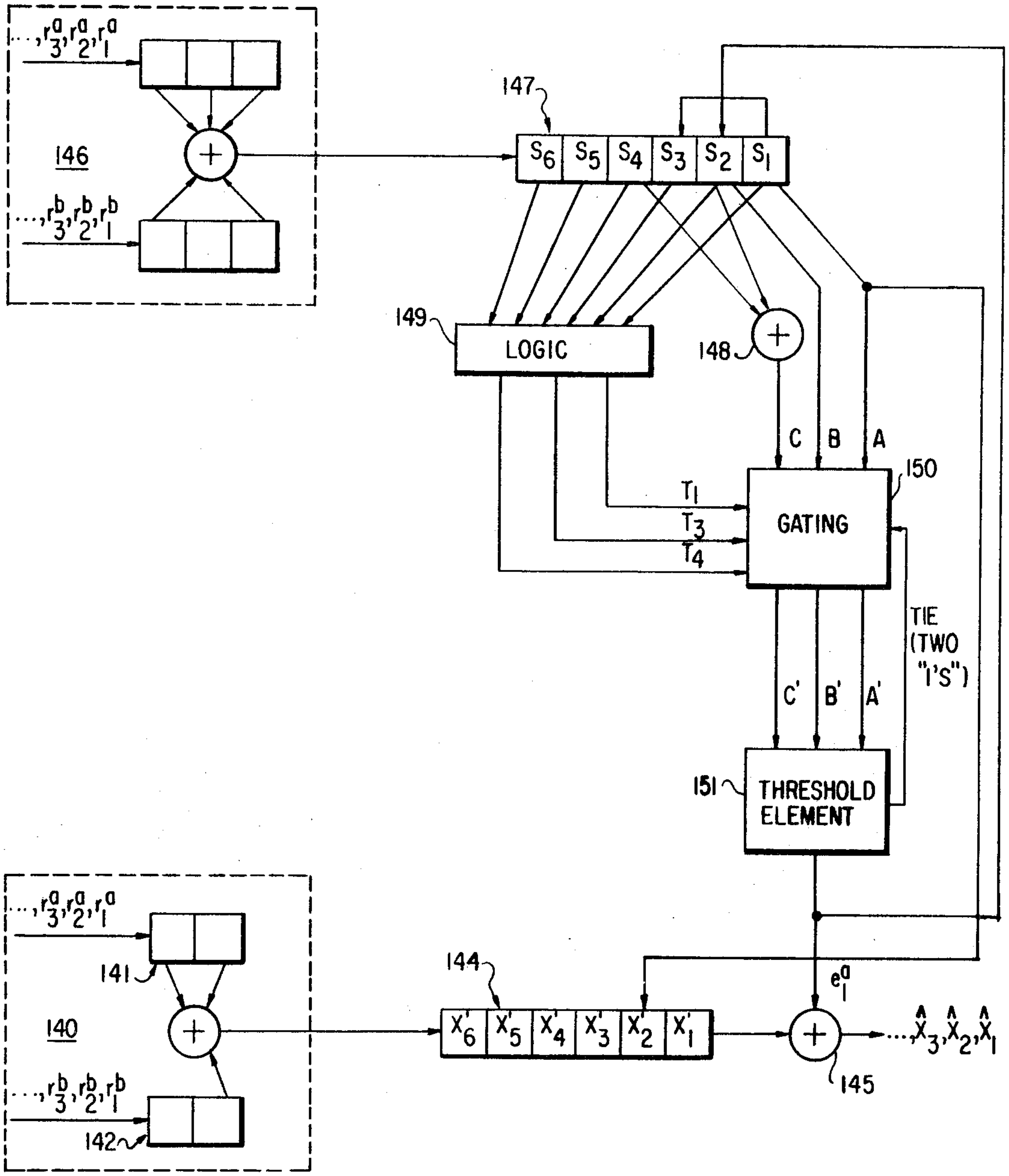
FIG. 5 is a circuit diagram of a second embodiment of a modified threshold decoder according to the invention.

A second embodiment of the present invention is shown, in a specific implementation in FIG. 5 and, in a more generalized form, in FIG. 6. As in the first embodiment advantage is taken of a threshold decoding technique in which estimates are made to normally ascertain the value of an information bit by a majority vote, and in which syndrome information is used to resolve ties in the vote. According to the second embodiment, however, only a single estimate of each information bit is obtained, and a set of estimates, one less in number than was required for each information bit in the first embodiment, is obtained for each error bit.

Referring to FIG. 5, and using the same code example as previously, an inverter 140 comprises two two-stage shift registers 141, 142 and a modulo-two adder 143 arranged to sum both bits of register 141 and output bit of register 142. Register 141 receives the "$a$" channel bit train and register 142 receives the "$b$" channel bit train. The output bit train provided by inverter 140 is the information bit train, assuming there are no errors in encoding or transmission. This output bit train is shifted into a six stage shift register 144, the output stage of which provides one input signal to a modulo-two adder 145. If the effects of the error bits are considered, the inverter output bits may be represented as follows:

$$x_1'=x_1\oplus e_1^a,$$
$$x_2'=x_2\oplus e_1^a\oplus e_1^b\oplus e_2^a,$$
$$x_3'=x_3\oplus e_2^a\oplus e_2^b\oplus e_3^a$$
$$x_4'=x_4\oplus e_3^a\oplus e_3^b\oplus e_4^a.$$

The received "$a$" channel and "$b$" channel bits are also applied to a syndrome calculator 146, identical to syndrome calculator 26 of FIG. 2, and the syndrome bits are shifted into a six-stage shift register 147. This portion of the decoder, and the following circuitry, perform the function of estimating the error bits. The estimates of $e_1^a$ are represented as follows:

$$A=S_1=e_1^a\oplus e_1^b,$$
$$B=S_2=e_1^a\oplus e_2^a\oplus e_2^b, \text{ and}$$
$$C=S_2\oplus S_4=e_1^a\oplus e_3^a\oplus e_4^a\oplus e_4^b.$$

Estimates A and B are derived from the $S_1$ and $S_2$ syndrome bits, respectively, directly. Estimate C is derived with the air of modulo-two adder 148 which sums syndrome bits $S_2$ and $S_4$. In addition, all six syndrome bits are applied to a logic circuit 149 which performs the same function as logic circuit 55 of FIG. 3 in deriving functions $T_1$, $T_3$ and $T_4$ from the syndrome bits.

On the first clock cycle the estimates A, B, and C are passed through gate 150 to threshold element 151. If none or only one of the estimates is a "1", the decision $e_1^a=0$ is made. If all three estimates are "1's", the decision $e_1^a = 1$ is made. If two of the estimates are 1's, there is a tie, this condition being sensed by threshold element 151 as $$T=A'B'\overline{C'}+A'\overline{B'}C'+\overline{A'}B'C'$$

and the tie signal fed back to enable gate 150 to alter estimates A, B. C in accordance with functions $T_1$, $T_3$, $T_4$. In particular, functions $T_1$, $T_3$, and $T_4$ are added modulo-two to the estimates A, B, C, respectively, in gate 150. Assuming that the error pattern is correctable, one of the estimates is complemented, and the threshold element makes the correct decision on this cycle. This estimate of $e_1^a$ is added to the estimate of $x_1$+ from the inverter to remove $e_1^a$. The effects of $e_1^a$ and $e_1^b$ are then removed from $x_2'$, $S_2$, and $S_3$ in a manner conforming to that described above for the earlier embodiment. The Boolean functions $T_1$, $T_3$, and $T_4$ are identical to the Boolean functions $T_1$, $T_3$, and $T_4$, respectively, as set forth in connection with the previous embodiment.

The generalized form of the embodiment of FIG. 5 is illustrated in FIG. 6. Corresponding elements in the two FIGURES are provided with the same reference numerals, a prime being added for the elements of FIG. 6. Operation of the system of FIG. 6 is apparent from that which has been described with reference to FIG. 5.

While certain specific embodiments of the invention have been illustrated and described it will be clear that variations of the details of construction which are specifically disclosed may be resorted to without departing from the spirit and scope of the invention, as defined in the appended claims.

What is claimed is:

1. A threshold decoder for a digitally coded format of bits containing information and possibly containing transmission errors, comprising means responsive to an incoming format of bits for estimating the value of certain bits in the format, means responsive to the estimates of individual bits for rendering a threshold decision determinative of the information content of successive segments of the format based on the number of estimates in the majority for each segment, means further responsive to the incoming format for calculating the syndrome of a correctable error pattern in the segment of the format under consideration, and means responsive to the calculated syndrome for resolving conflicting estimates that would otherwise preclude said threshold decision, to yield a majority of estimates in agreement from which said threshold decision can be rendered.

2. A threshold decoder of claim 1, wherein said means for estimating comprises logic circuit means for forming a set of independent estimates of each information bit in said format, each of the estimates in a set being dependent upon a different error bit in combination with the same information bit.

3. The threshold decoder of claim 2, wherein the set of independent estimates of each information bit contains a number of estimates which is less than the minimum distance of the code.

4. The threshold decoder of claim 3, wherein the code has an odd minimum distance.

5. The threshold decoder of claim 1, wherein said means for estimating comprises logic circuit means for forming a set of independent estimates of each error bit in said format.

6. The threshold decoder of claim 5, further including means responsive to said incoming format for further deriving a single estimate of each information bit in logical combination with an error bit, and means responsive to said single estimate of an information bit and to the threshold decision based on said set of estimates of the respective error bit, for logically combining the threshold decision and the single estimate to eliminate the error bit from the single estimate.

7. The threshold decoder of claim 1, wherein the digital code of said format is one of a convolutional code, a diffuse convolutional code, and a block code.

8. The threshold decoder of claim 1, wherein the digital code of said format is at least a double error correcting code.

9. The threshold decoder of claim 1, further including means responsive to the threshold decision for removing the effects of the binary values resolved by that decision from future decisions.

10. The threshold decoder of claim 2, wherein the number of independent estimates possible in each set is less than the minimum distance of the code, and wherein the error pattern renders a maximum of one-half of said possible estimates erroneous.

11. A decoder for convolutional codes in which each segment of a received coded sequence consists of an information bit combined with a bit attributable to transmission error, if any, said decoder comprising means responsive to the received sequence for producing a set of independent estimates of the value of a sufficient part of the combination of bits constituting each received bit to obtain a threshold decision regarding the value of the information bit corresponding to that received bit, wherein the threshold decision is based on a majority vote of the estimates, and the set of estimates is insufficient in number to correct all double error patterns because of a substantial likelihood of ties between the number of correct and incorrect estimates, means further responsive to the received sequence for calculating the syndromes corresponding to correctable error patterns therein, and means responsive to the syndrome calculated for a correctable error pattern pertaining to the received bit being decoded, for extracting therefrom a set of logical functions sufficient to resolve a tie in said threshold decision and thereby to decode the information bit in the received bit.

12. The decoder of claim 11, wherein said means for producing a set of estimates comprises means for estimating the value of each information bit in the sequence, whereby the threshold decision itself determines the information bit.

13. The decoder of claim 11, wherein said means for producing a set of estimates comprises means for estimating the value of each error bit in the sequence, whereby the threshold decision provides sufficient intelligence from which the information bit may be determined.

14. The decoder of claim 13, wherein is further included means for deriving a single estimate of each information bit as affected by a respective error bit, and means responsive to said single estimate and to said threshold decision for removing the effect of the respective error bit from said single estimate.

15. The decoder of claim 11, wherein is further provided means responsive to a threshold decision for supplying the results of that decision to both the estimating and syndrome calculating means, to remove from future decisions the effects of items already determined by a decision.

* * * * *